Sept. 11, 1962     E. G. SCHLAYER ETAL     3,053,386
LIQUID TIGHT PACKAGE
Original Filed Sept. 24, 1957     6 Sheets—Sheet 1

*INVENTORS*
EARLE GEORGE SCHLAYER
HENRY GEGNER
LEONARD WILLIAM BALLWIG
JEROME RYERSON SHERIDAN

BY *Samuel Frank Walker*
ATTORNEY

Sept. 11, 1962   E. G. SCHLAYER ETAL   3,053,386
LIQUID TIGHT PACKAGE
Original Filed Sept. 24, 1957    6 Sheets-Sheet 2

INVENTORS
EARLE GEORGE SCHLAYER
HENRY GEGNER
LEONARD WILLIAM BALLWIG
JEROME RYERSON SHERIDAN
BY
Samuel Branch Walker
ATTORNEY Sept. 11, 1962   E. G. SCHLAYER ETAL   3,053,386
LIQUID TIGHT PACKAGE Original Filed Sept. 24, 1957   6 Sheets-Sheet 3

*INVENTORS*
EARLE GEORGE SCHLAYER
HENRY GEGNER
LEONARD WILLIAM BALLWIG
JEROME RYERSON SHERIDAN

BY
*Samuel Branch Walker*
ATTORNEY

Sept. 11, 1962
E. G. SCHLAYER ETAL
3,053,386
LIQUID TIGHT PACKAGE
Original Filed Sept. 24, 1957
6 Sheets-Sheet 4
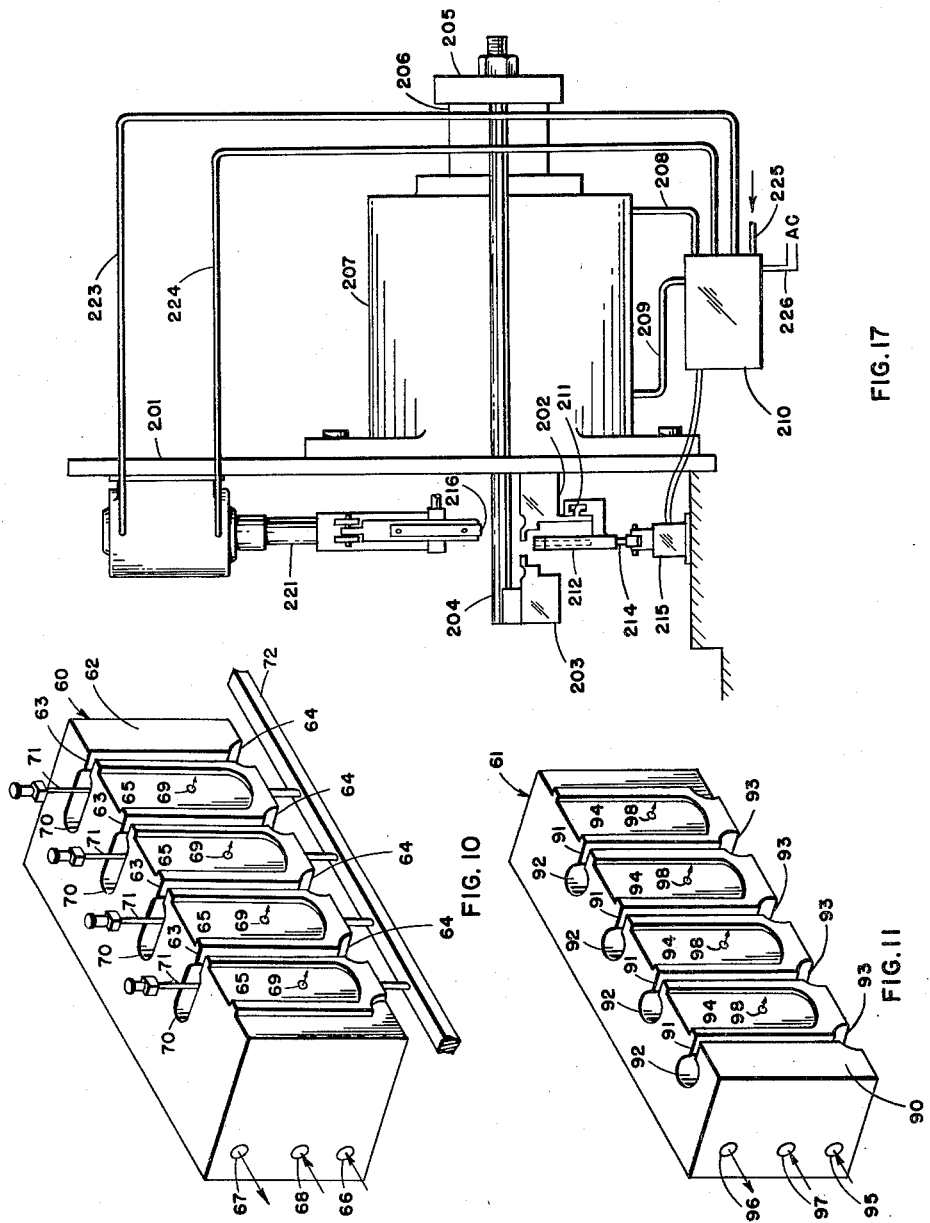
INVENTORS
EARLE GEORGE SCHLAYER
HENRY GEGNER
LEONARD WILLIAM BALLWIG
JEROME RYERSON SHERIDAN
BY
Samuel Branch Walker
ATTORNEY

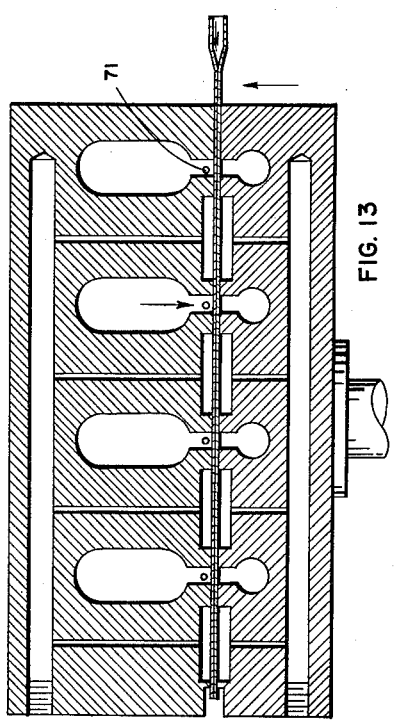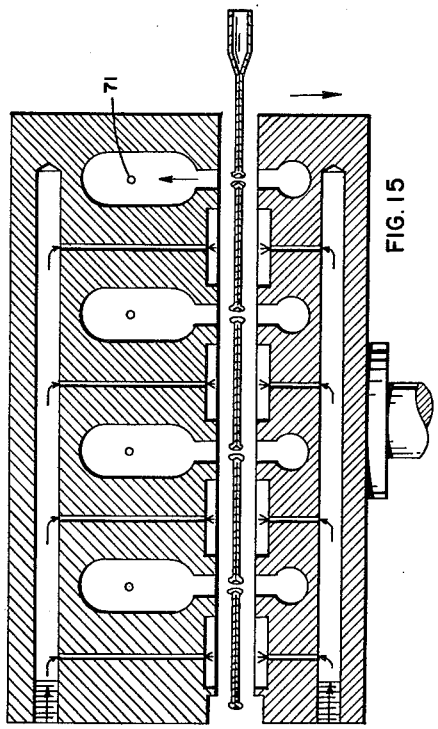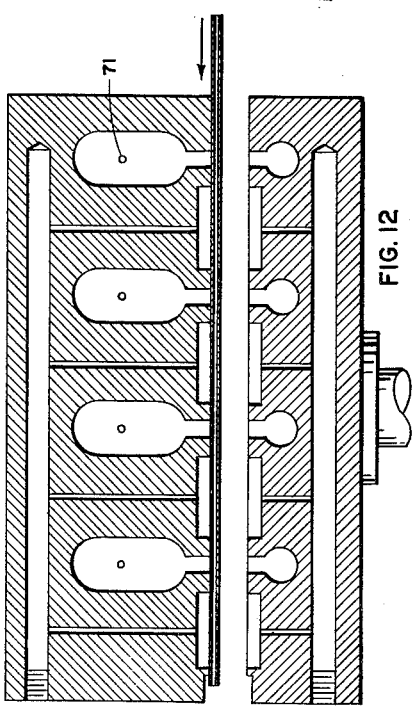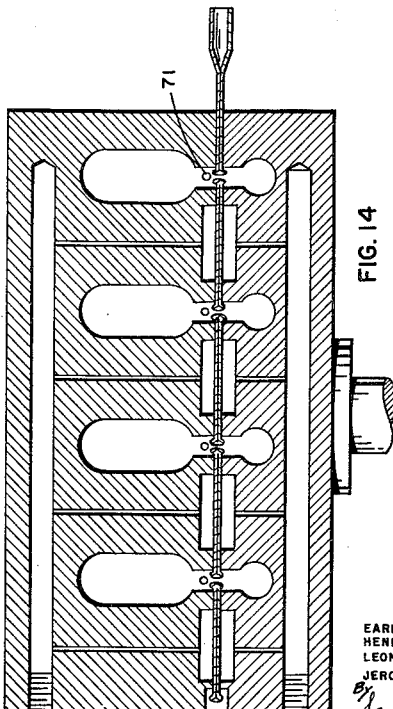

Sept. 11, 1962     E. G. SCHLAYER ETAL     3,053,386
LIQUID TIGHT PACKAGE

Original Filed Sept. 24, 1957     6 Sheets-Sheet 6

INVENTORS
EARLE GEORGE SCHLAYER
HENRY GEGNER
LEONARD WILLIAM BALLWIG
JEROME RYERSON SHERIDAN

BY Samuel Branch Walker
ATTORNEY

United States Patent Office 3,053,386
Patented Sept. 11, 1962

3,053,386
LIQUID TIGHT PACKAGE
Earle George Schlayer, Henry Gegner, and Leonard William Ballwig, Danbury, Conn., and Jerome Ryerson Sheridan, Madison, Wis., assignors to American Cyanamid Company, New York, N.Y., a corporation of Maine
Original application Sept. 24, 1957, Ser. No. 685,935, now Patent No. 2,948,999, dated Aug. 16, 1960. Divided and this application June 17, 1960, Ser. No. 36,845
3 Claims. (Cl. 206—63.3)

This invention relates to a liquid tight package of a thermoplastic, heat-sealable, oriented, fusible, resin composition film which prevents the diffusion of moisture, for either materials which must be protected from moisture, or items such as surgical sutures, which are packaged in a liquid. This application is a division of our copending application, Serial No. 685,935, filed September 24, 1957, now Patent No. 2,948,999, dated August 16, 1960, entitled "Manufacture of Suture Packages."

Generally, surgical sutures, and particularly proteinaceous sutures, have been sealed in a tubing fluid in a glass tube. Such glass tubes give adequate protection to the suture but are bulky, expensive, and fragile. Broken glass from breaking the tubes introduces additional hazards in surgical procedures. Chips of glass can cut the surgeon's glove, or stick to a suture and become embedded in the patient, and prevent proper healing. The desirability of flexible plastic envelopes has been recognized by the large amount of patent art on such packages. However, for proteinaceous sutures requiring a tubing fluid, the standards of commercial acceptability have not been adequately met. Theoretically, hermetically sealed plastic envelopes can be produced by prior art methods and in fact some have been produced, but reliable, cheap, effective methods of producing such suture packages have long been sought, but eluded the arduous pursuit of those skilled in the field.

In sealing two or more thicknesses of thermoplastic film to form a package the usual procedure has been to use a bar seal in which heating has been exteriorly applied to soften the film and cause contacting thicknesses to adhere. This procedure is satisfactory with films which have a wide softening range so that the film is softened enough to stick to itself at the interfaces between the sealed films before the film melts at the heat source contacting face. With sharp melting films, adequate sealing procedures cannot be developed based on such a method of operation, because the rate of heat transfer through the film is so slow that commercial production rate standards cannot be met.

It has also been proposed to melt the edges of two thicknesses of film and cause them to adhere to each other as a bead, but in the past such beaded-edge envelopes have been undesirably subject to leakage in the corners. Additionally many of the desirable thermoplastic, heat-sealable, fusible, resin compositions are of an oriented or stretched material. Melting of this material destroys the orientation and may render the seal brittle. The brittleness is particularly noted after such an envelope has been heat sterilized.

In the manufacture of surgical sutures and for many other purposes it is necessary or desirable that the interior of the package be sterile. The effect of heat on many plastic materials is well-known and after a film which has been stretched and oriented is reheated, the film tends to lose the characteristics given to it by the stretching and becomes an unoriented material again as it passes through the liquid phase and as a result an edge bead may become fairly brittle particularly if the bead is large. If the bead is kept fairly small, it is difficult or impossible to guarantee that it is free from pin holes as in melting the two adjacent thicknesses there is not sufficient material to completely flow over any such pin holes. In other words, it has been a problem of first trying to get a bead large enough so that it would be free from pin holes, and second, trying to get a bead small enough that it would not be unduly brittle. Even at best this is difficult. Adjacent the fold of the film material, where there is stiffness of the material to be contended with tending to keep the two films apart, the problem has been so complex as to have been insurmountable.

Additionally, after beaded-edge envelopes are produced, if they are to contain a liquid, there is the problem of sealing above the level of the liquid. In the formation of the beaded edge there is apt to be a very slight setting apart between the edges, as the film tends to spring slightly away from itself and as a result there is a fine hole adjacent the bead through which capillary action readily feeds liquid into the area being sealed, and inasmuch as the film material has a melting point above the boiling point of the liquid contents of the envelope, there is a tendency for this evaporating liquid to prevent sealing of the envelope.

We have now found that a satisfactory seal can be obtained as a beaded-edge seal by holding the films closely together under pressure during the melting of the two thicknesses of the film to provide the fused bead and by forming a slightly larger bead in the form of a corner ball with a slight rounding of the edge by melting slightly more of the film adjacent to the corner. This procedure has the advantage of having a comparatively small edge bead along the major portion of the edge but at the corner where most leaks have previously occurred, there is an enlargement of the bead and this enlargement gives greater rigidity, greater freedom from leakage, and a smooth effect. This rounding is so slight that the additional stiffness is not deleterious because it does not extend far enough along the edge for the enlarged corner ball to have to flex as the edge of the envelope is flexed and as a result, there is a superior effect obtained at this point also.

The smaller bead is able to withstand the effects of heat sterilizing without becoming too brittle to be useful.

At the seal of the open edge after the package is liquid filled, it has now been found that it is necessary for the two film thicknesses to be held against each other with such force that the liquid contents cannot by capillary action be drawn up between the films. To do this it is necessary to press the two film thicknesses into contact with each other with a comparatively high pressure. This high pressure at the same time has the effect of crushing the edge beads at the point where pressure is applied so that even though the films just adjacent to the fused edge bead are spaced slightly, as the bead is crushed the films are brought into face to face contact with each other and any surface imperfections at this point which might otherwise allow liquid to be drawn therethrough by capillary action are pressed together to give a liquid tight seal. Above the zone which is crushed together, the two film thicknesses may be melted, preferably by radiation, and as the two film thicknesses fuse together to form a unitary bead, a smooth uniform leak-proof seal is formed. Because the edge bead on the lateral edges gives a slight increase in the amount of material available for melting, corner balls are also formed where the two edge beads meet the top sealing bead. This bead is not as difficult as are the side beads because it does not necessarily have to be reheated for sterilization, and as a result retains more flexibility than the beads which have to be reheated in sterilization.

For the closing bead it is convenient to seal each individual envelope separately by pressing it between crushing jaws, but for larger numbers of packages it is convenient to place a plurality of packages in a common carrier in which the crushing of the edge beads, holding of the film, and the sealing above the zone held together is accomplished by a single heating means for a plurality of envelopes at one time.

For some materials such as polyethylene the sealing of either the edges or the top of the envelope may be accomplished by heating members which actually contact the film. However, for most purposes it is much preferred to use radiant heat because the heating member does not come in contact with the composition forming the film and accordingly, the film cannot stick to the heating member. If the member contacts the film there is a little of the material which sticks to the heated member and this material is transferred to the next seal, and, as it is maintained hot, frequently becomes brittle and changes characteristics so that each subsequent seal is in part formed by material transferred by the contacting sealing member, which tends to give dirty seals, may give uneven contacts, and may, in fact, prevent satisfactory operation. The same applies to the top seal. With polymeric ethylene terephthalate films satisfactory results with contacting heating elements can only be obtained if the elements are cleaned after almost every contact.

Particularly on the side seal, it is convenient to use a double heating step in which a radiant member is brought adjacent to the films which heats them sufficient to melt through the two films and permit the two films to melt into contact with each other; the radiant energy is then discontinued as, for example, either by permitting the heating wire to cool; or by moving it away from the zone where heat is transferred to the films; and permitting the edge bead to cool and solidify; then the wire is again reheated adjacent to the edge bead, which again reheats the edge bead, but with the advantage that only the portion of the edge bead which is closest to the radiant wire is completely melted. This heating and reheating gives a smoother edge bead than can otherwise be obtained. It also gives a much greater flexibility to the apparatus because if two film thicknesses are melted to form a fairly small edge bead, at times there will be feathers or small projecting portions which extend across the gap which has been melted, leaving spines. Any such small portions which stick out are particularly susceptible to heating on the second application of heat and, therefore, melt first, thus giving an inherently smooth and stable method of sealing.

With careful timing and heating adjustment, the apparatus can be made to function with but a single heating pass. With the use of two passes, the time and heating cycles are much less critical, and much easier to adjust. Similarly, a reheating cycle can be used for the top seal, although with the top seal a reheat usually is not necessary, as no material is severed, and spines or strings are not formed.

In filling the envelope after the edge beads are formed and before the closing bead is placed across the top, conventional methods may be used. It is convenient to spread the envelope, insert the contents such as sutures therein, and then sterilize. The sutures which may be of gut, are conveniently doubled, wound, and placed in a paper label, and the labelled suture inserted into open envelopes and the assembly then sterilized. It is possible, of course, to sterilize the envelope first and insert a sterile suture, sterilely, but it is generally preferred in sterile operations to do as many operations as possible before sterilization as each additional operation required after sterilization increases the risk of contamination and the cost of operating. After the envelopes containing the sutures are sterilized, it is a simple matter to add a tubing fluid to the envelope under sterile conditions and seal the envelope as above-mentioned. It is to be appreciated that the difficulties of sterilizing after the liquid is added are much greater because of the volatility of the liquid. Also, if the suture and tubing liquid are heated together, the suture usually loses most of its strength.

As will be obvious, the same type of suture package may be used with silk sutures which are to be packaged dry, or with other forms of sutures which are to be packed either wet or dry. If the packets are sealed dry, the filling of them is easier and the problems caused by liquid leakage are minimized, but nonetheless, it is equally desirable that the seals be liquid-proof because the suture containing packages should be externally sterile at the time of opening to avoid chance contamination of the contents from the outside of the packages, hence they are frequently stored in a sterilizing liquid. If this liquid can penetrate the seals and get to the suture on the inside, the advantages of a dry suture are lost and additionally the sterilizing liquid may be one which contains ingredients which would destroy the strength of the suture or which would cause irritation in the patient in which the suture is used.

Where in this specification the term "suture" is used, it is to be understood that ligatures are also included. The difference between these two classes of material is more of a matter of use than of the properties. The same strand may be used for both purposes by a surgeon in a single operation.

Also it is to be understood that the suture may be either needled or not. The use of needled sutures in which the suture is permanently attached to a needle is becoming increasingly common because by using such a suture there is less damage done to the tissue. In using a needle with an eye, the suture is threaded through the eye of the needle, and extends out and down on both sides of the needle, giving a doubled thread. The needle must be big enough to have an eye which will contain this double suture, all of which causes additional complications in threading the suture and additional damage because of the large size of the double suture as it goes into the patient. The use of attached needles, which are single-use needles, also increases the rapidity of operating room procedures because there is no necessity for having a nurse present to thread the needle.

The present invention is particularly conveniently used with such a type of suture as the needles may be readily inspected through the sides of the package to see that they are the particular form that is desired. Further, there is no distortion, such as is effected by looking through a round glass tube, and the needle is seen in true perspective. Rust inhibitors may be conveniently included in the tubing fluid to prevent the rusting or degrading of the needle.

Some of the characteristics of needles and sutures which are satisfactory for use with the present invention are described at length in the copending application of Henry J. Rynkiewicz and Gilbert B. Ayres, Serial No. 372,215, filed August 4, 1953, entitled "Suture Package." That application particularly describes the use of ethylene oxide gas in sterilizing the open ended envelope containing the suture and also enclosure and sterilization of a packaged suture in an outer package.

It is to be understood that whereas the present invention describes the manufacture of a package containing a tubing fluid therein, which package is hermetically sealed, such packages themselves may be enclosed in outer envelopes, which may also contain a jar fluid, and which outer envelopes are of the same material, same type of construction, and sealed the same as are the inner envelopes. The jar fluid may be of a composition which is incompatible with the suture as it does not come in contact with said suture.

The thermoplastic, heat-sealable, oriented, fusible, resin composition may be any one which forms a film which is water impermeable and readily handled. Among such materials are the polymeric alkylene terephthalates, such as polymeric ethylene terephthalate ester films, some of which are currently sold under the trade-name "Mylar." Certain of these polymeric esters are described in United States Patent 2,497,376, Februray 14, 1950, Swallow et al., "Process of Producing Films." In addition to the polymeric ethylene terephthalate films such as described in said patent, other thermoplastic, heat-sealable, oriented, fusible, resin compositions may be used such as the superpolyamides, some of which are sold under the name nylon, as well as polystyrene, polyvinyl chloride and polyvinyl alcohol films. These materials in general have the characteristic that when heated they are tacky, they solidify on cooling, they form a fusible film, which film can be oriented by stretching, and the stretched film has both a transition temperature where the orientation changes, and a melting point. Below the first transition temperature, the material is an amorphous and oriented material which exhibits certain of the properties of a glass. Whereas, most of these materials are single polymers, it is not necessary for the purposes of the present invention that such films be of a single polymeric material, in fact laminates may be used in which the various layers have different characteristics. The films themselves and the methods of their formation are not part of the present invention and are known to those skilled in the art.

The exact characteristics of the material do have an important bearing on the operating pressures and temperatures. For example, during the final sealing operation where the two films forming the sides of the envelope are pressed together and the beads crushed, it is important that the pressure used be sufficient to hold the films in contact with each other and overcome any small minor surface irregularities, as well as crush the beads, but at the same time the pressure must not be high enough to cut through the films. The films which are more resistant and harder can stand a higher pressure and require a higher pressure than the softer, more easily deformed materials.

Similarly, a higher melting material requires the application of more radiant energy to melt through it. The exact temperatures and pressures are easily ascertained by inspection during operations using the present description as a guide.

The size of the edge bead varies in part with the thickness of the material and the size of the envelope. Films that are less than 2 mils (0.002 inch) are so thin and flexible as to be satisfactory only for small envelopes or envelopes in which rigidity is not a problem. Films with a thickness of around 3 mils are particularly convenient for the ordinary size suture packages which measure from an inch by an inch up to two by three inches. Heavier films may be used, for example, a film thickness of 5 to 10 mils may be used for a large package which contains a plurality of smaller suture packages or has other contents therein. Envelopes of at least several feet in each dimension can be produced from the heavier films. Normally as thin a film as is self-sustaining is desired because of the cost of the materials, and for this reason a 2 to 3 mil film is particularly advantageous with small suture packages.

The amount of heat to melt through the films and cause the formation of the edge bead varies considerably with the characteristics of the particular film being used and the dimensions of the sealing platens. A 1/16 inch resistance wire operated at from a dark cherry to bright red gives satisfactory results. A smaller wire at a higher heat or a larger wire at a lower heat may be used, and similarly if the slots in the face of the platen are wider, a lower temperature energy source is satisfactory and the beads are normally somewhat larger. By using narrower slots, smaller wires, and higher temperatures, a smaller edge bead is obtained. Such variations will be apparent from the description of the accompanying drawings showing a specific embodiment of this invention.

In the drawings:

FIGURE 10 is a view of the stationary cut-off platen.

FIGURE 11 is a view of the moving cut-off platen.

FIGURE 12 is a top view of the cut-off platens with the film in the positioning step.

FIGURE 13 is a top view of the cut-off platens showing the film in position ready for the cutting-off operation before the cutting and sealing occurs.

FIGURE 14 is a top view of the cut-off platens during the sealing step, as the beads are formed.

FIGURE 15 is a top view of the cut-off platens during the release step.

FIGURE 17 is a sectional view of the closing sealing machine.

*Suture Package*

Whereas, the present liquid tight package may be used for packaging many items, it will be described particularly in connection with a suture.

Figure 1:
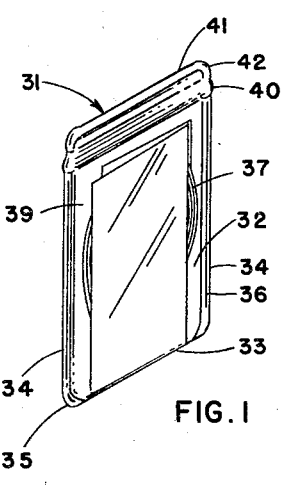
FIGURE 1 shows a pictorial view of the complete suture package.
Figure 2:
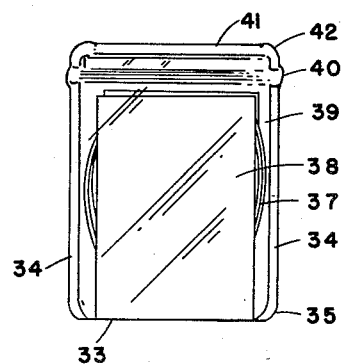
FIGURE 2 shows a face view of the complete suture package.

As shown in FIGURE 1 the suture package 31 comprises a film of a thermoplastic, heat-sealable, oriented, fusible, resin composition. Particularly the invention will be illustrated with a film of a polymeric ethylene terephthalate which is commercially available under the trademark "Mylar." The film 32 is folded back on itself to give a folded edge 33. From the folded edge extend two fused beaded edges 34 which preferably are at right angles to the folded edges. These fused beads are the result of melting the two facing films together and allowing the surface tension of the molten material to cause the material to assume the configuration which has the least surface, namely, a smoothly rounded bead of approximately circular cross-section.

For a 3 mil film (0.003 inch) an excellent seal is obtained with a fused beaded edge having a thickness measured perpendicular to the film of 20 to 25 mils.

At the juncture of each of these fused beaded edges and the folded edge is an enlarged bead forming a corner ball 35. The juncture of the fused beaded edge and the folded edge is rounded and the corner ball has a greater thickness than that of the fused beaded edge. For the above-mentioned envelope the diameter perpendicular to the film is found to be 30 to 35 mils. This greater thickness at the corner gives less flexibility but at the corner flexibility is not needed and the additional melted material as it solidifies insures against leakage at this point as the greater diameter of molten mass will bridge over any gap between the two film thicknesses resulting from the tendency of the films to pull apart at the folded edge.

It is difficult to sufficiently sharply crease the film that a slight spread between the film thicknesses does not occur and right at the juncture of the fold there is a tendency towards a small pin hole. This corner rounding is necessary to give leak-free envelopes under commercial production conditions.

Without the corner ball some of the envelopes will not leak, with the corner ball from nearly perfect to perfect sealing results.

Inside the envelope 36, formed by the two film thicknesses, the folded edge, and the two fused edges, is a suture 37. This suture may be folded in various fashions. It is particularly convenient for the suture to be doubled and wound in a small coil so that the center doubled point is easily found when the suture is unpackaged. It is customary for sutures to be supplied in lengths of from 54 inches up. Such a suture is a little bit too long to be conveniently stretched straight between the hands of the user. By having the suture doubled so that the center point can be easily grasped, the suture may be unfolded or unreeled and stretched straight while doubled to overcome any flexing which results from its standing in the coiled condition and such stretching may be rapidly accomplished with no danger of losing an end. The coiled suture is preferably folded in a label 38 on which label is printed identifying indicia as to the origin and the characteristics of the particular suture. The identifying information can be placed on the face of the envelope as by printing or embossing either before or after the envelope is filled, but from the production standpoint it is more convenient to use a paper label to give lot numbers, needle characteristics, suture characteristics, and product numbers.

The suture coiled in the label is in the envelope and immersed in a tubing fluid 39. While in no way limited thereto a convenient tubing fluid consists of 99½% ethanol, and ½% benzene, as the liquid phase and 0.2% thymol. It may also contain 0.1% of 1,1'-hexamethylene bis[5(parachlorophenyl)biguanide]diacetate. Other tubing fluids known to the art may be used.

Above the suture and its label near the last sealed edge of the envelope is a crushed area 40. The crushed area, which may vary from a few hundredths of an inch to an eighth of an inch or more in width, is an area in which the fused beaded edges are pressed flat, that is to the original thickness of the two films or slightly less, and above this crushed area is a closing fused bead 41. The closing fused bead is also formed by melting the two film thicknesses to a liquid and permitting the liquid resulting from the melting of each of the film thicknesses to join together and by surface tension form a bead of substantially circular cross-section. This closing bead may have the same thickness as the fused beaded edges. At the juncture of the closing fused bead and each of the fused beaded edges is a slight rounding to form a closing fillet ball 42. The rounding which occurs as the closing fused bead and the fused beaded edges melt together results in a slight thickening at this portion which gives a reinforcing and hence increased structural strength. This ball has thicknesses of about 32 to 40 mils for the 3 mil film referred to above.

The suture packages are produced on a novel machine, the description of which follows. First the method and apparatus is described for making the open ended envelope, and then is described the method of applying the final or top seal.

*Cut-Off and Sealing Apparatus*

Figure 6:
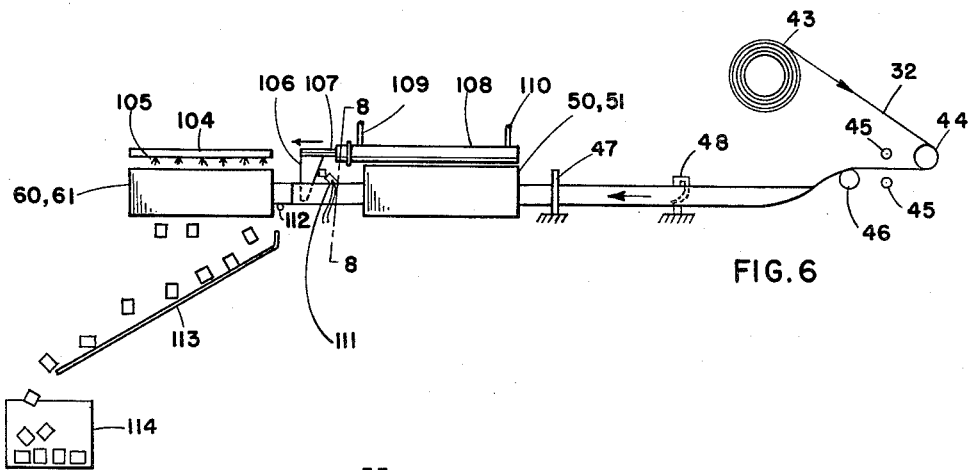
FIGURE 6 is an assembly view of the machine for forming the open ended envelopes.
Figure 8:
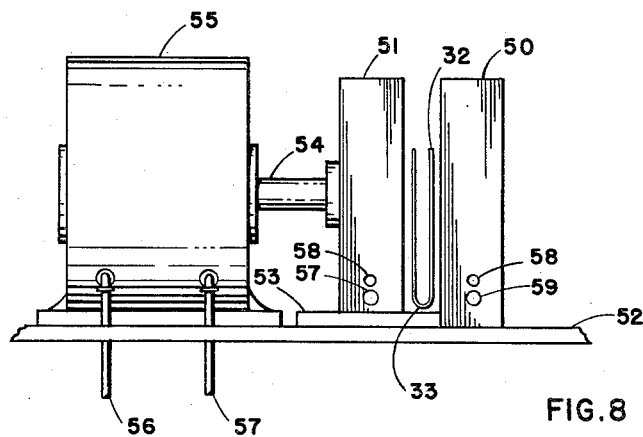
FIGURE 8 is a longitudinal view of the creasing jaws.
Figure 7:
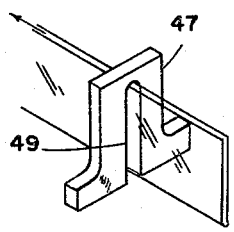
FIGURE 7 is a view of a doubling guide.
Figure 9:
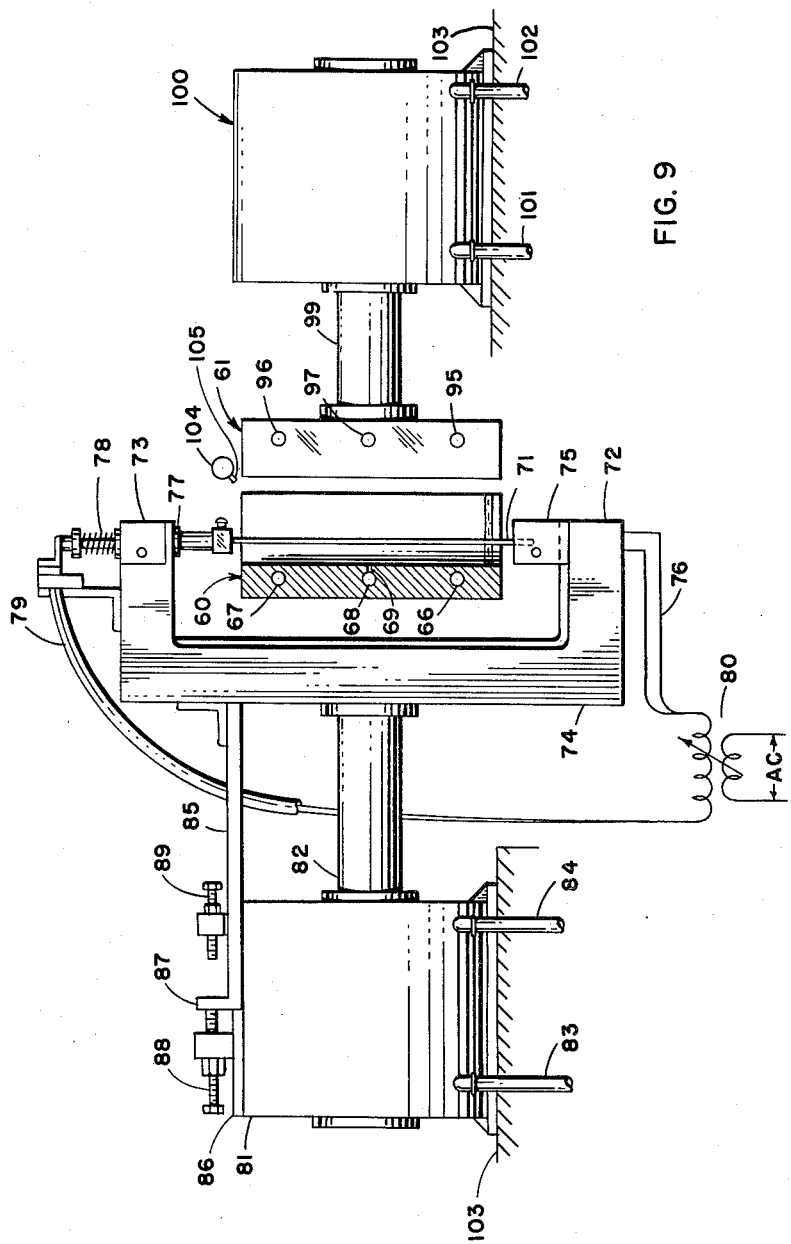
FIGURE 9 is a longitudinal view of the cut-off and sealing machine.

The apparatus for forming the envelopes from a continuous film is shown in FIGURE 6. The continuous film of material from which the envelopes are formed is supplied as a reel of film 43. The reel may have a slight drag thereon so as to keep the film taut. The film 32 is drawn from the reel, passed around a guide roll 44, and between the static eliminators 45. The static eliminators are sources of ionizing radiation which may be either a radio-active source or ionizing radiation supplied from a suitable electrical source generating ionizing radiation as required. The ionizing radiation causes the air in the vicinity of the film to become conductive. Normally as a film such as a polymeric ethylene terephthalate is drawn from a reel there is a high static charge on the film which causes the film to stick to various rolls over which it passes, set up high static charges which give shock to operators, and to stick to itself or anything else having dielectric characteristics. The feeding and operating of the machine is much smoother if the static charge is removed from the film. The removal of the static charge is particularly necessary if there are explosive vapors in the vicinity.

After passing between the static eliminators, the film passes over a feed roll 46 and through a doubling guide 47. Conveniently a feed finger 48 extends into the middle of the film to aid in causing it to double. The continuous film is doubled about the center of its longitudinal axis so that a doubled strip is obtained, the edges of which are preferably at the same height. The doubling guide may be merely a narrow slit 49 and as the strip is drawn through this slit, it necessarily assumes the proper doubled configuration.

After passing through the doubling guide the film passes through the creasing jaws. These consist of a stationary creasing jaw 50 and a moving creasing jaw 51, which are flat blocks of heat conducting material. Bronze is easily handled, conducts heat rapidly, and is stain-resistant. The opposing faces of these jaws should be smooth and parallel. The stationary jaw 50 is attached to a frame 52. The moving jaw 51 moves in guides 53 attached to the frame 52 and is controlled by piston rod 54 from a creasing jaw air cylinder 55. The piston in the air cylinder 55 is driven by air through the closing pipe 56 and the opening pipe 57. The timing of the operation will be later described.

The creasing jaw air cylinder forces the creasing jaws together on the doubled film 32 thus tightly compressing the two opposing films against each other. Part of the jaw opposite the folded edge 33 of the film is heated by jaw heaters 58 shown diagrammatically, and the temperature is controlled by jaw thermostats 59 shown diagrammatically. The thermostats are set so that the part of the jaw contacting the folded edge 33 is slightly below the melting point of the film. For certain "Mylar" films a temperature of 163° to 166° F. may be used. The remainder of the jaw need not be heated but is warmed to some extent by conduction of heat from the part of the jaws adjacent to the folded edge.

The timing of operation of the creasing jaws is conveniently about the same as on the cut-off platens 60 and 61, which are later described. The pressure for the sharp creasing is not critical but conveniently for creasing jaws which may be from 6 to 12 inches long, an 8 inch air cylinder operating at 60 pounds per square inch gives an effective crease; less pressure is adequate or more pressure may be used. Sufficient pressure is required that the film be sharply creased so that on release from the creasing jaws the two facing films tend to remain together rather than spring apart.

In the line of travel of the doubled film after passing through the creasing jaws are the cut-off platens 60 and 61. The cut-off platens are preferably of a heat conducting material such as bronze which is also corrosion resistant, and have opposing parallel faces. The stationary cut-off platen 60 has in the film contacting face 62 a series of slots 63. The slots are spaced apart the distance between cut-offs in the film, that is the width of the envelope plus meltback. The edges of the slot are substantially parallel over the major portion of the slot length but diverge near the bottom in a divergent zone 64. This divergent zone is at a height such that it is just above the folded edge of the film during operation. The divergent zone may extend from a distance of five or ten times the film thickness up to as much as one-tenth of an inch, or more for large envelopes, above the level at which the folded edge of the film contacts the film's contacting face 62 of the platen. Adjacent to the slots but separated therefrom in the film contacting face is a relieved area 65. The relieved area is to reduce the pressure necessary to hold the doubled film in position between the cut-off platens. For small envelopes the relieved area may be omitted. The remaining film contacting face has at least sufficient area to give good thermal contact with the film. A cooling fluid flows into the cooling fluid inlet 66 and out of the cooling fluid outlet 67. Tap water may be used. Additionally a releasing air inlet 68 is provided through which air is fed to releasing air jets 69. The releasing air which passes through the releasing air inlet 68 to the releasing air jets 69 blows the finished envelopes away from the face of the platen after the envelopes are finished.

It will be apparent that the number of slots in the face of the platen can vary depending upon the number of envelopes which are to be produced at each operation. For purposes of convenience, four slots are shown in the drawing. These slots are wide enough so that the molten film composition at no time touches the platens. Should the liquid film composition at any time touch jaws and platens, the adhering composition should be immediately cleaned off.

Behind each slot is provided a cut-off wire passage 70. The cut-off wire passage may be the same size as the slots themselves but conveniently is considerably wider to enable easier assembly and to permit inspection of the cut-off wires 71 and reduce radiation losses from the wires. A group of cut-off wires 71 are ganged between cut-off wire supports 72 and 73. The cut-off wires are insulated and individually supported between the lower cut-off wire support 72 and the upper cut-off wire support 73, which form part of the cut-off wire support frame 74. The cut-off wire 71 is conveniently a high resistance metallic element such as a Nichrome wire which is retained between insulators 75 in the lower cut-off wire support, each cut-off wire being attached to a separate cut-off lead 76, and an upper insulator 77 supporting the upper end of the cut-off wires. The upper insulator slides in the upper cut-off wire support and by means of a spring 78, which is in compression, keeps the cut-off wire taut. An upper lead 79 is connected to the upper end of each cut-off wire. The leads 76 and 79 from each wire are attached to a source of electrical power which includes a variable transformer 80 which permits the voltage and hence the heating effect of each wire to be individually adjusted. One end of the wire may be grounded on the frame and only one lead used, if all wires are properly polarized.

Movement of the cut-off wire support frame 74 is controlled by a cut-off wire air cylinder 81 from which a piston rod 82 extends on which the cut-off wire support frame 74 is mounted. A positioning air line 83 and a retraction air line 84 connect to operating valves later described which cause the frame 74 to advance to the cut-off position and retract as desired. Also positioned on the frame is a cut-off wire frame guide 85 which slides in a way 86 in the cut-off air cylinder 81, which prevents the frame from rotating and aids in assuring its correct movement. Also mounted on the cut-off wire frame guide 85 is a positioning block 87, the limits of motion of which are controlled by a retraction adjustment screw 88 and a positioning adjustment screw 89. These positioning screws are set so that the cut-off wires 71 retract into the cut-off wire passage 70 when not in operation and the cut-off wire moves forward into the slot 63 adjacent to the film during the actual cut-off step as will be later described.

A $3/16''$ slot with a $1/16''$ heating wire gives excellent results with doubled 3 mil film.

The moving cut-off platen 61 is opposed and parallel to the stationary cut-off platen 60 and has a matching face. This matching face or moving film contacting face 90 has slots 91 therein which lead to a slot relief passage 92. At the lower part of the slot is a divergent zone 93. In the face is a relieved area 94. These areas match corresponding parts of the stationary cut-off platen. Preferably the moving cut-off platen is made of the same material as the stationary cut-off platen and the slot relief passages, slots and relieved areas are machined in the same fashion so that any expansion or contraction or stresses in one are matched by corresponding stresses in the other so that the working faces remain parallel and cooperate with each other. The moving cut-off platen 61 also has a cooling fluid inlet 95, a cooling fluid outlet 96, and a releasing air inlet 97 which leads to releasing air jets 98 in the relieved area 94 of the cut-off platen 61. The moving cut-off platen 61 is mounted on a platen piston rod 99 which extends from a cut-off platen operating air cylinder 100. A releasing air pipe 101 and holding air pipe 102 lead to the appropriate sides of the air cylinder and are connected to an air source through valves, later described, for controlling the position of the moving platen. The cylinders 81 and 100 are mounted on a frame 103 the details of which may be conventional.

Above the moving platen is a cooling air manifold 104 having a plurality of cooling air jets 105. One such jet is directed into each of the slots 91.

The feed of the doubled film between the cut-off platens is accomplished by a feed blade 106. This blade as shown in FIGURE 6 is attached to a feed piston rod 107 extending from a feed cylinder 108. As shown in FIGURE 6, this feed cylinder is conveniently located above the creasing jaws 50 and 51, although it may be located elsewhere and the motion suitably transmitted by levers or rods. A feed air pipe 109 and a retraction air pipe 110 control the position of the feed blade. A safety switch 111 is mounted adjacent the feed blade.

A guide pin 112 is located at the bottom of the path of the doubled film just before the film enters the cut-off platens and is at such a height that it controls the proper height of the doubled film in relationship to the cut-off platens. Beneath the cut-off platens is located a discharge chute 113 to receive the envelopes after they have been formed as they are blown from the cut-off platens. This chute discharges the envelopes into a suitable receiver 114.

*Operation of Envelope Forming*

The continuous roll of film is fed from the reel 43 around the guide roll 44 between the static eliminators 45 over the feed roll 46 and is manually doubled about the feed finger 48 and while doubled is passed through the doubling guide 47. The end of the film is then by hand pulled between the creasing jaws 50 and 51 and on each side of the feed blade 106 so that the feed blade is in the trough of the U formed by the doubled film and the end of the film is pulled between the cut-off platens. The end of the film is conveniently pulled out beyond the end of the cut-off platens. Positioning adjustment screw 89 is set so that in the forward position the cut-off wires come close to but do not touch the film. A gap of $1/16''$ to $1/32''$ is satisfactory. This allows for the forming of the bead as the film melts, and any slight warping which may occur as the bead is formed. A timing motor 115 and a reduction gear 116 are mounted on a timing frame 118 and drive a cam shaft 117. On the cam shaft are mounted a plurality of timing cams 119. Each timing cam drives a cam follower switch 120 which in turn controls a solenoid air valve 121 between a compressed air manifold 128 and a pipe leading to the cylinder end or manifold controlled by a particular valve and its associated cam and switch. Connecting wires 122 extend from the cam follower switch to the solenoid air valve. Conveniently each cam consists of a cam disc 123, mounted on a cam collar 124 which is positioned with screws 125 on the cam shaft. These screws permit the position of the cam to be angularly changed when desired. On the face of each cam is a cam lifter 126 which is attached to the cam disc with lifter screws 127. Thus by the choice of cam lifters of various lengths the degree of dwell can be conveniently controlled and by means of the adjusting screws 125 the relative timing of the cams can be readily adjusted. Fixed cams on an integral shaft may be used but the adjustability of the instant system gives greater flexibility as the relative timing of each operation and the relative dwell of each operation can be conveniently changed in accordance with changing conditions, and such a switch solenoid system to an air line gives greater flexibility and trouble free operation. Eight of the solenoids are powered from an alternating current line direct. The remaining two solenoids are wired in series through switch 111 so that air to the platen holding air pipe 102 and the cut-off positioning air line 83 are controlled by the safety switch 111. Thus, if for any reason the feed mechanism should jam, the platens and cut-off wires cannot be forced into the feed blade 106 thus bending the feed blade or breaking part of the mechanism.

In operation as the cam shaft turns the operations follow sequentially. Starting with the completion of a feed stroke as the feed blade 106 returns to position, the creasing jaws close, compressing the doubled film between the creasing jaws. These jaws are conveniently kept closed until just before the next feed cycle. At the same time as the creasing jaws close, but independently thereof, the moving cut-off platen closes. As soon as this platen is closed the cut-off wire support frame is moved forward. The wires are adjusted to between a dark cherry and red heat (about 700° C. to 900° C.). Heat from the wires adjacent to the doubled film melts through the films and the molten part of each of the doubled films joins thus forming the bead. At this point the cut-off wires are moved back, and the bead is permitted to solidify. The wires move forward and heat is reapplied, the bead again remelted giving smooth configuration, and melting down any splines. The wires then are retracted. At this point cooling air is fed through the cooling air manifold 104 and the cooling air jets 105 down through the slots cooling each of the beads. As soon as the beads have firmly set, the moving cut-off platen retracts, and additional air is fed through the releasing air inlets 68 and 97, to the releasing air jets 69 and 98. These jets blow the thus formed envelopes away from the face of the platens and operating in conjunction with the cooling air jets 105 which now function as discharging jets, blow the envelopes away from the platens and down into the discharge chute 113. After a short blast, the air is turned off and the feed blade 106 moves forward, picks up the last seal formed in the last slot on the end of the doubled film and draws the film forward between the cut-off platens and positions the film for a new sealing operation. The feed blade then retracts to its original positions and actuates the safety switch 111. At this point the cycle is again ready to begin.

The cut-off wires may be heated only during the time when radiant heat is needed to cut off and seal the envelope edge beads, but a faster cycle can be utilized if the wires are left hot.

FIGURE 12 shows the platens with the film in position between them.

FIGURE 13 shows the platens closed, and the wires advanced to the cut-off position before the cutting and sealing occurs.

FIGURE 14 shows the platens with the film in position, after the beads are formed.

FIGURE 15 shows the platens open, as the envelopes are blown into the discharge chute.

A cycle of from 4 to 5 seconds for each heating step, and 4 to 5 seconds for the cooling gives good results. With hotter wires, a shorter heating cycle is used. The second heating cycle may be shorter than the first.

Filling of Envelopes

The thus formed envelopes may be opened and a suture inserted therein and the envelope then sterilized by heat while containing the suture. The bead becomes more brittle during the sterilizing heat but because the bead is of comparatively small cross-section, it is still sufficiently flexible for shipping and use. The bead can be broken by abuse but is not broken during normal use.

The sterilized envelopes containing the sterile sutures are then filled with the tubing fluid and top sealed.

Sealing Machine

Figure 3:
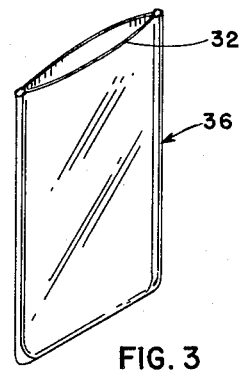
FIGURE 3 shows an open ended envelope ready for the suture to be inserted therein.
Figure 4:
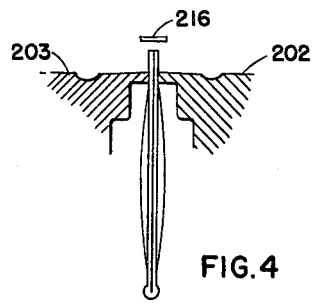
FIGURE 4 shows an open ended filled envelope containing the suture and the tubing fluid engaged between the crushing jaws.
Figure 5:
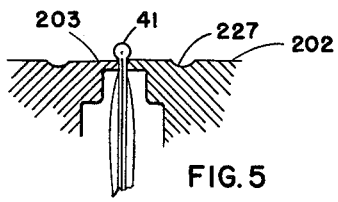
FIGURE 5 shows the same envelope after the closing bead has been placed on the envelope.
Figure 16:
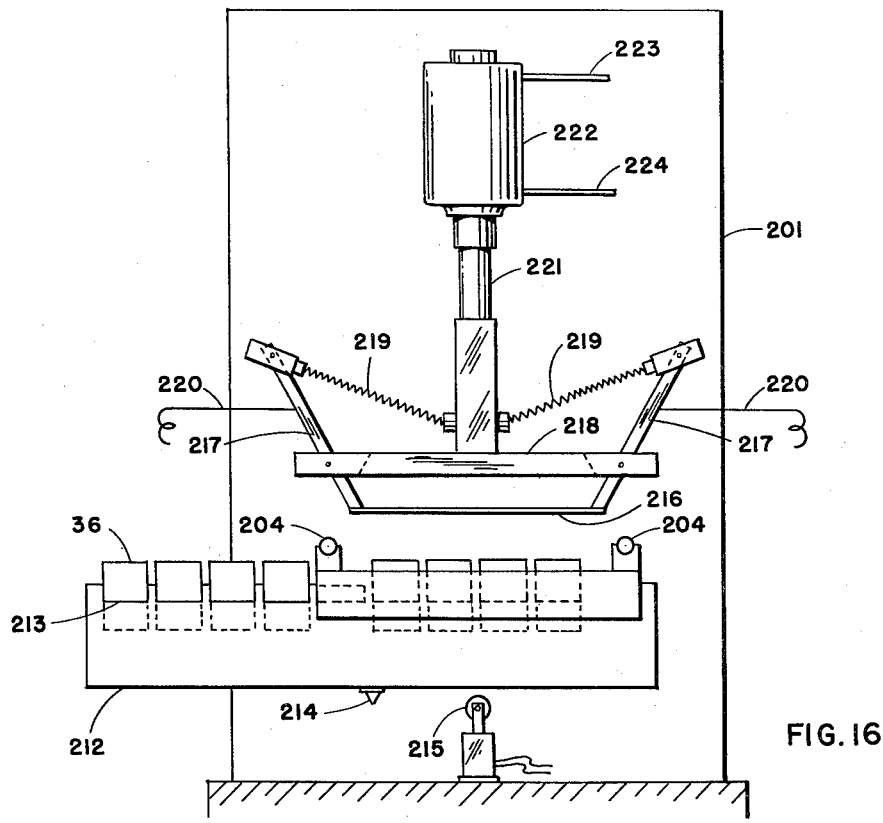
FIGURE 16 is a face view of the closing sealing machine.
Figure 18:
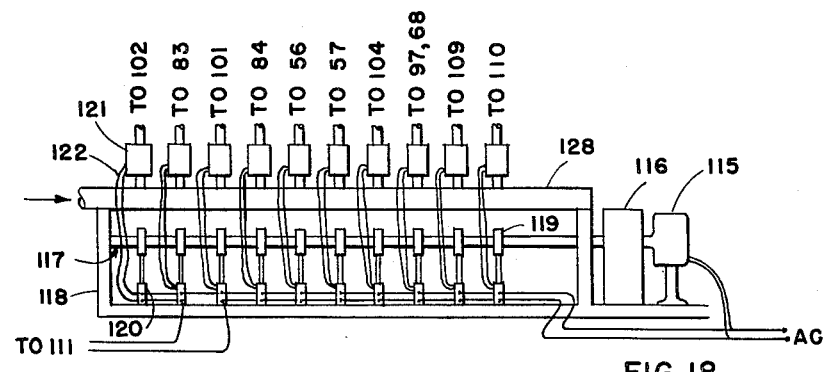
FIGURE 18 is a view of the wiring and valve assembly for the cut-off machine.
Figures 19, 20:
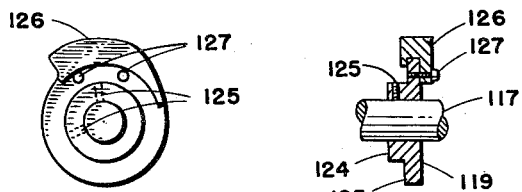
FIGURE 19 is a detailed face view of a cam for the cut-off machine.
FIGURE 20 is a sectional view of a cam for the cut-off machine.

The top sealing machine is shown in FIGURES 16 and 17. FIGURES 4 and 5 are a cross-section of the sealing jaws before and after the sealing operation showing the envelope in position.

The top or final sealing machine consists of a vertical frame on which is mounted a stationary crushing jaw 202. Opposed to the stationary crushing jaw is a moving crushing jaw 203. The moving jaw 203 is mounted on a pair of guide rods 204 which extend through the vertical frame 201 to a cross-bar 205 which is mounted on the end of the piston 206 of the crushing air cylinder 207. The crushing air cylinder in turn is mounted on the vertical frame 201. The releasing air line 208 and the crushing air line 209 extend from the crushing air cylinder to a timer 210. Mounted on guides 211 on the stationary crushing jaw 202 is a carrier 212. In the carrier are a group of envelope holding slots 213 in which are mounted a plurality of envelopes 36. The carrier is mounted to reciprocate through the jaws with one end of the carrier extending out of the jaws for a loading operation while the other side of the carrier is between the crushing jaws for the sealing operation. Loading and unloading is conveniently manually accomplished. Under the carrier is a timing cam 214 which as the carrier is moved from one side to the other actuates a timing switch 215 which is connected to the timer 210. Above the crushing jaws is a sealing ribbon 216. This sealing ribbon is attached to and mounted between insulated sealing ribbon arms 217 which are pivoted in a sealing cross-head 218 and kept taut by springs 219. Leads 220 extend to a source of electric power. The sealing cross-head 218 is mounted on a sealing piston rod 221 extending from the sealing cylinder 222. The position of the sealing cross-head is controlled by the lowering air line 223 and the raising air line 224 which extend to the timer.

The crushing jaws themselves have thin edges opposed to each other which are parallel. The top of the jaws slope back from the edge of the jaws so any liquid spilling from the envelopes flows away from the jaws to a groove 227. For sealing a group of envelopes it is important that the pressure on these crushing jaws be sufficient to crush the beads on the edges of the envelopes and force the opposing films forming the envelope into liquid tight relationship with each other. A pair of jaws approximately a thirty-second of an inch in face width and having a length sufficient for four envelopes each approximately an inch and a half wide of 3 mil polymeric ethylene terephthalate film gives good results with an eight inch air cylinder operating at 45 to 60 pounds per square inch.

In operation a group of envelopes are placed in one end of the carrier under sterile conditions and sterilely filled with the amount of tubing fluid for each. This operation is conventional.

The carrier is then shoved to the other side and as the timing cam 214 hits the timing switch 215 the sealing operation is initiated. The timer is so arranged that pressure from the air supply 225 is introduced through the crushing air line 209 into the crushing air cylinder 207 which closes the crushing jaws with the level of the crushing jaws just below the top of the open lips of the envelopes in the carrier. The jaws crush the beads and hold the lips in liquid-tight relationship with each other. Any excess liquid flows out over the lips of the envelope. Simultaneously, by pressure through the lowering air line 223 the sealing ribbon, which is a high resistance electrical element, is brought down into juxtaposition to the open lips, but not touching these lips. FIGURE 4 shows the position of the sealing ribbon 216 above but not touching these lips. A clearance of a couple of hundredths of an inch is satisfactory. The ribbon is kept hot at all times and, the ribbon is kept taut by the action of the springs 219. Heat from the ribbon first causes any fluid trapped between the lips to evaporate and as additional heat is applied, the top surface of the lips start to melt and as they melt to a liquid, fuse to each other and join to form a single bead. The timer is adjusted so that as soon as this bead is formed, the sealing ribbon is raised so that heat is no longer applied. The bead rapidly hardens by exposure to room air and the crushing jaws are released by releasing air applied through the releasing air line 208 from the timer. The jaws should be kept cool to aid in rapid cooling of the bead. If the jaw temperature exceeds about 100° F., and radiation is not sufficient to cool the jaws, fluid cooling of the jaws may be used.

As soon as the operator has the next group of envelopes ready to be sealed, the carrier is moved to the other side and the operation is repeated. Meanwhile the filled, sealed envelopes are removed from the carrier and the carrier again loaded.

A pneumatic three way valve timer, provides for time adjustment, and controls the rate of closing and opening of the jaws. A heat cycle of 5 to 10 seconds and a cooling of about 5 seconds gives good results.

Many modifications of the present apparatus may be made by those skilled in the art such as using different types of timing mechanisms or timing controls or other actuating mechanisms than air cylinders—for instance, cams and levers.

Air cylinders controlled through solenoid valves from switches are particularly convenient, readily adjustable, and trouble-free, although the details of these controls may be conventional.

Whereas, it is understood that such obvious equivalents may be used by those skilled in the art, the scope of the present invention is set forth in the appended claims.

We claim:

1. A liquid tight package comprising: a sealed flexible envelope of a film of a thermoplastic, sharp-melting heat-sealable, oriented, fusible resin composition; said envelope having one folded edge, from folding a flat sheet of film against itself, two fused beaded edges, each intersecting said folded edge, an enlarged bead forming a corner ball and an at least slightly rounding of the fused beaded edge at the juncture of the folded edge and each of said two fused beaded edges, a crushed area over which the two edge beads are crushed to substantially the combined film thickness near the edge of the envelope opposite to said folded edge, and a closing fused bead between said two fused beaded edges sealing the edge of the envelope opposite the folded edge each of said two fused beaded edges and said closing fused bead comprising an external bead, having a thickness greater than the combined film thickness and a rounded periphery of well over 180 degrees.

2. A suture package comprising: a liquid tight sealed flexible envelope of a film of a thermoplastic, sharp-melting heat-sealable, oriented, fusible resin composition; said envelope having one folded edge, from folding a flat sheet of film against itself, two fused beaded edges, each intersecting said folded edge, an enlarged bead forming a corner ball and an at least slight rounding of the fused beaded edge at the juncture of the folded edge and each of said two fused beaded edges, a crushed area over which the two edge beads are crushed to substantially the combined film thickness near the edge of the envelope opposite to said folded edge, and a closing fused bead between said two fused beaded edges sealing the edge of the envelope opposite the folded edge; a tubing liquid in and substantially filling said envelope, and immersed in said tubing liquid a surgical suture, each of said two fused beaded edges and said closing fused bead comprising an external bead, having a thickness greater than the combined film thickness and a rounded periphery of well over 180 degrees.

3. A suture package comprising: a liquid tight sealed flexible envelope of a film of a thermoplastic, sharp-melting heat-sealable, oriented, fusible resin composition; said envelope having one folded edge from folding a flat sheet of film against itself, two fused beaded edges, each intersecting said folded edge, an enlarged bead forming a corner ball and an at least slight rounding of the fused beaded edge at the juncture of the folded edge and each of said two fused beaded edges, and a closing fused bead between said two fused beaded edges sealing the edge of the envelope opposite the folded edge; a tubing liquid in and substantially filling said envelope, and immersed in said tubing liquid a surgical suture, each of said two fused beaded edges and said closing fused bead comprising an external bead, having a thickness greater than the combined film thickness and a rounded periphery of well over 180 degrees.

References Cited in the file of this patent

UNITED STATES PATENTS

| 1,607,626 | Hopkinson | Nov. 23, 1926 |
| 2,281,237 | Eckman | Apr. 28, 1942 |
| 2,488,212 | Lloyd | Nov. 15, 1949 |

FOREIGN PATENTS

| 747,162 | Great Britain | Mar. 28, 1956 |
| 1,068,972 | France | Feb. 10, 1954 |

UNITED STATES PATENT OFFICE
CERTIFICATE OF CORRECTION

Patent No. 3,053,386 September 11, 1962

Earle George Schlayer et al.

It is hereby certified that error appears in the above numbered patent requiring correction and that the said Letters Patent should read as corrected below.

Column 7, line 12, after "fused" insert -- bonded --; column 9, line 44, after "cut-off" insert -- wire --; column 12, line 23, after "frame" insert -- 201 --; column 13, line 56, for "slightly" read -- slight --.

Signed and sealed this 19th day of February 1963.

(SEAL)
Attest:

EASTON G. JOHNSON
Attesting Officer

DAVID L. LADD
Commissioner of Patents